(12) United States Patent
Adachi et al.

(10) Patent No.: US 7,346,216 B2
(45) Date of Patent: Mar. 18, 2008

(54) VIDEO ENCODING METHOD, VIDEO DECODING METHOD, VIDEO ENCODING APPARATUS, VIDEO DECODING APPARATUS, VIDEO ENCODING PROGRAM, AND VIDEO DECODING PROGRAM

(75) Inventors: Satoru Adachi, Yokohama (JP); Choong Seng Boon, Yokohama (JP); Sadaatsu Kato, Yokosuka (JP); Minoru Etoh, Yokohama (JP); Thiow Keng Tan, Jalan Sindor (SG)

(73) Assignee: NTT DoCoMo, Inc., Tokyo (JP)

( * ) Notice: Subject to any disclaimer, the term of this patent is extended or adjusted under 35 U.S.C. 154(b) by 760 days.

(21) Appl. No.: 10/658,190

(22) Filed: Sep. 10, 2003

(65) Prior Publication Data

US 2004/0071354 A1 Apr. 15, 2004

(30) Foreign Application Priority Data

Oct. 11, 2002 (JP) ............................. 2002-299512
Jul. 2, 2003 (JP) ............................. 2003-190567

(51) Int. Cl.
G06K 9/36 (2006.01)
G06K 9/46 (2006.01)
H04N 7/12 (2006.01)
(52) U.S. Cl. ...................................... 382/236; 382/233
(58) Field of Classification Search ................ 382/232, 382/233, 236; 348/409, 415, 439; 386/111, 386/112, 46, 68, 79, 65
See application file for complete search history.

(56) References Cited

U.S. PATENT DOCUMENTS 6,393,204 B2 * 5/2002 Setoguchi et al. .......... 386/111

FOREIGN PATENT DOCUMENTS

| JP | 9-186968 | 7/1997 |
|---|---|---|
| JP | 10-191257 | 7/1998 |
| JP | 10-191356 | 7/1998 |

OTHER PUBLICATIONS

Fumitaka Ono, et al., "Basic Technologies on International Image Coding Standards", Corona Publishing Co., Ltd., Mar. 20, 1998, pp. 236-267 (with English translation).
"Basic Technology of International Standard Image Coding", Corona Publishing Co., Ltd., pp. 236-239 (with English translation).
Thomas Wiegand, "Text of Final Committee Draft of Joint Video Specification (ITU-T Rec. H.264 / ISO/IEC 14496-10 AVC)", International Organisation for Standardisation, XP-001100641, Jul. 2002, pp. 1-197.
Miska M. Hannuksela, "Signaling of "clean" Random Access Positions", Joint Video Team (JVT) of ISO/IEC MPEG & ITU-T VCEG, XP-002264575, May 2, 2002, pp. 1-6.

* cited by examiner

*Primary Examiner*—Yon J. Couso
(74) *Attorney, Agent, or Firm*—Brinks Hofer Gilson & Lione

(57) ABSTRACT

A video processing system 100 is provided with video encoding device 10 and video decoding device 20. The video encoding device 10 implements backward interframe prediction from a temporally subsequent frame and outputs information indicating that an option to eliminate use of a decoded image of the temporally subsequent frame was chosen. The video decoding device 20 eliminates use of the decoded image of the frame on the basis of this information, in conjunction with input of the information for eliminating use of the decoded image of the temporally subsequent frame.

12 Claims, 11 Drawing Sheets

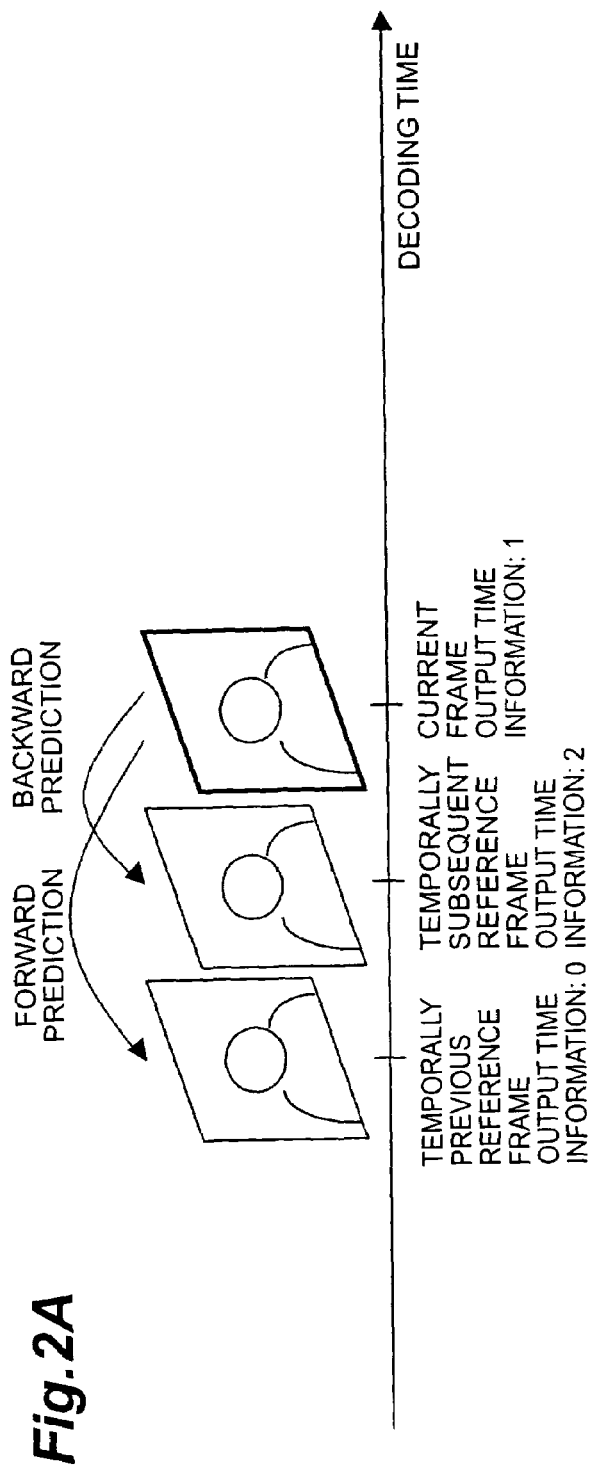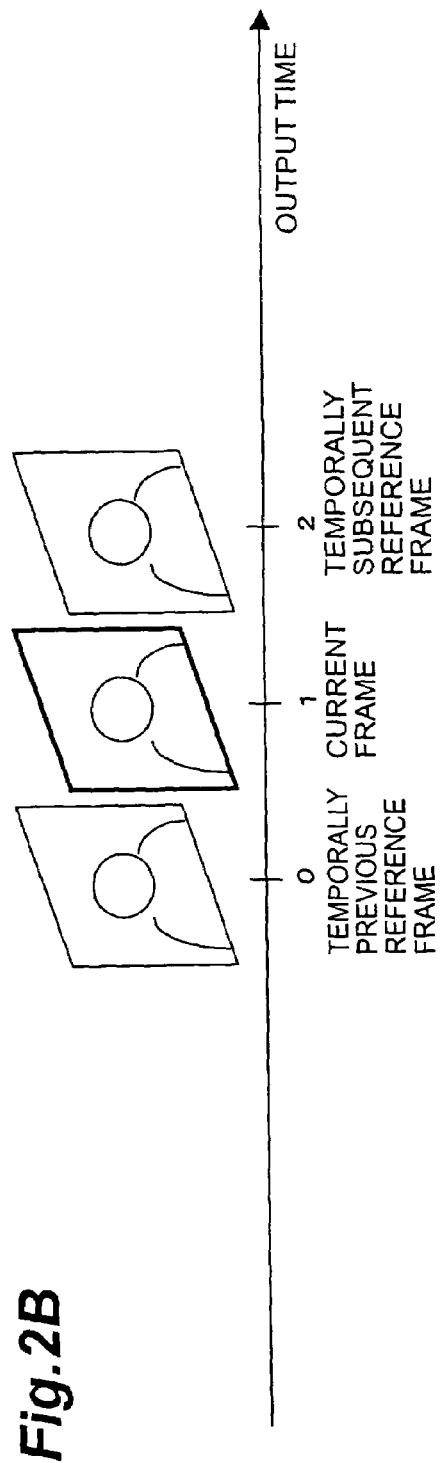

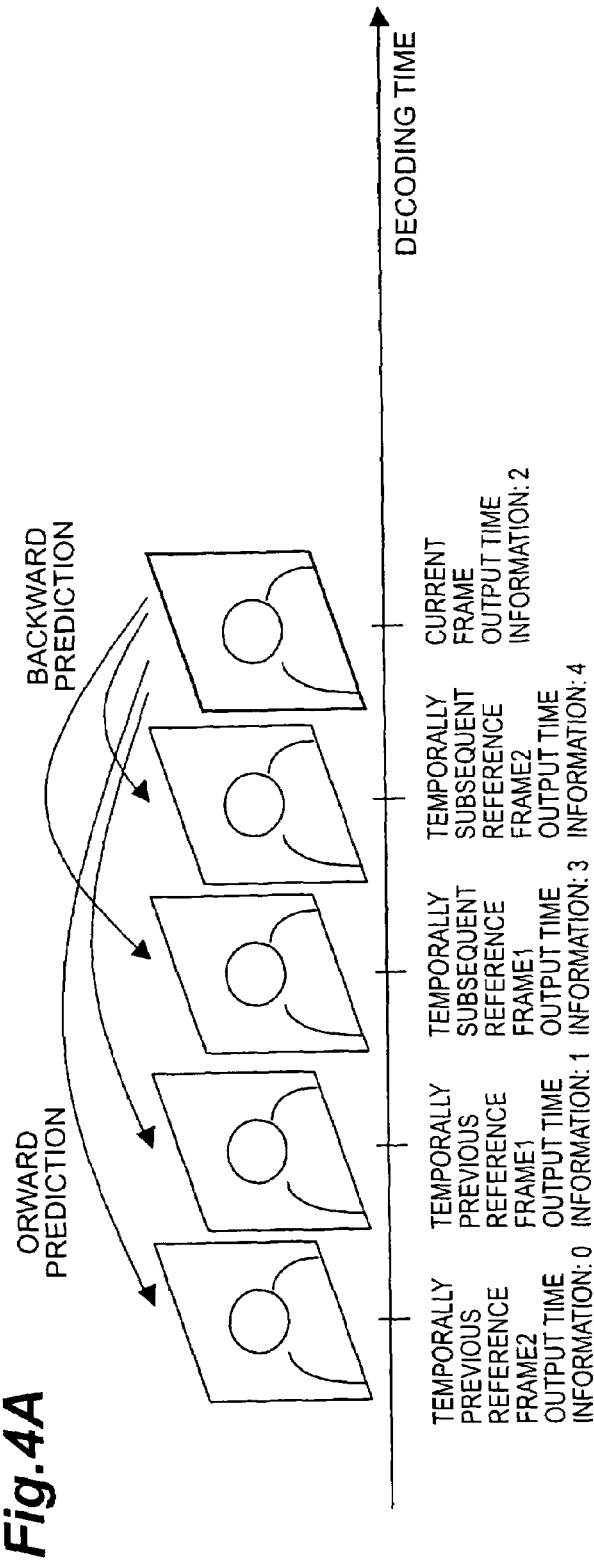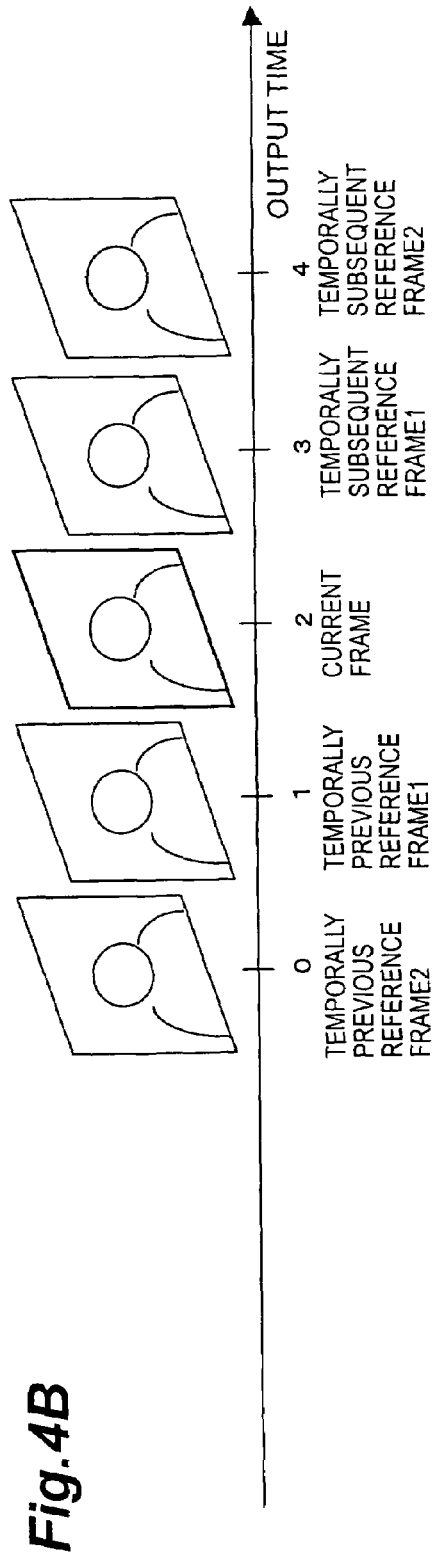

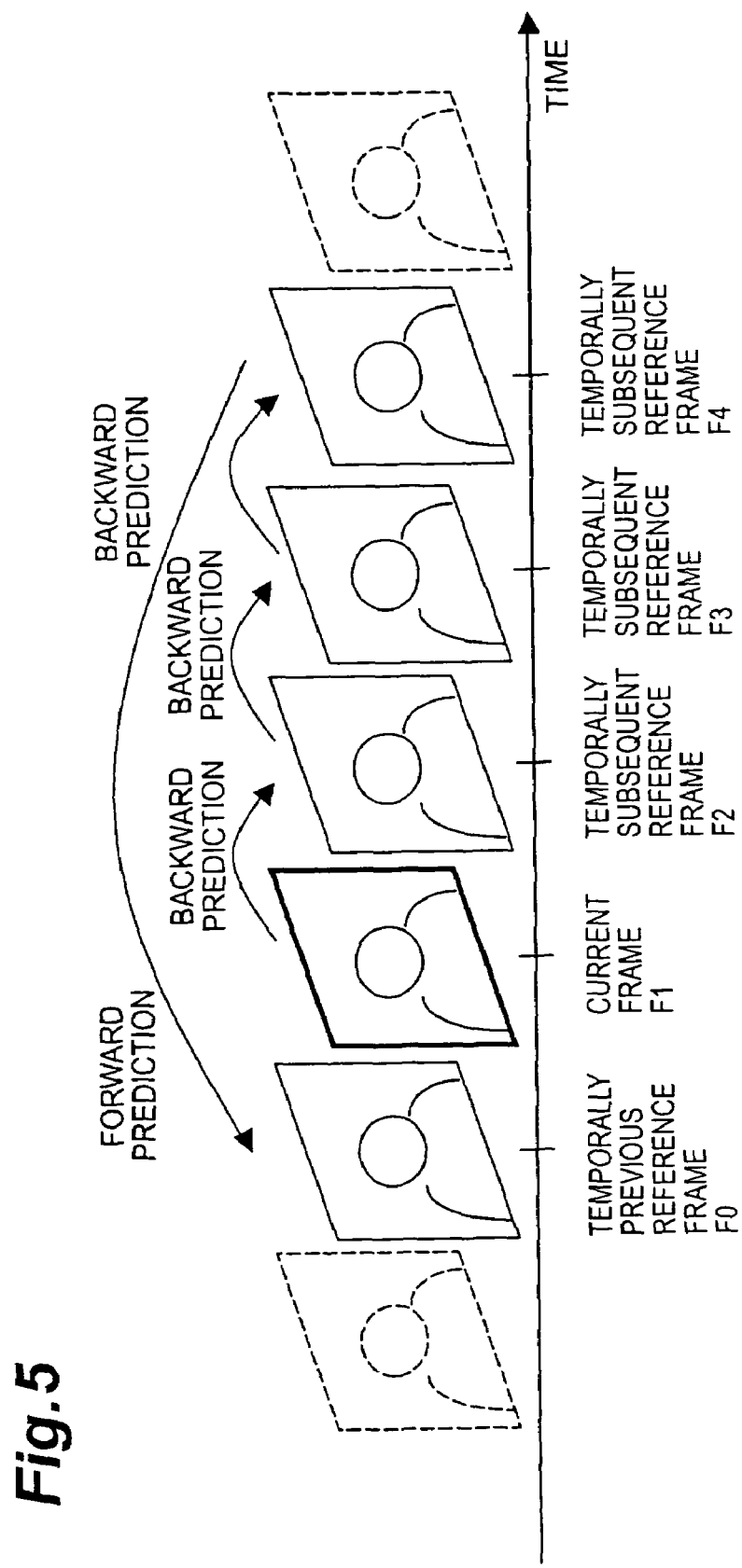

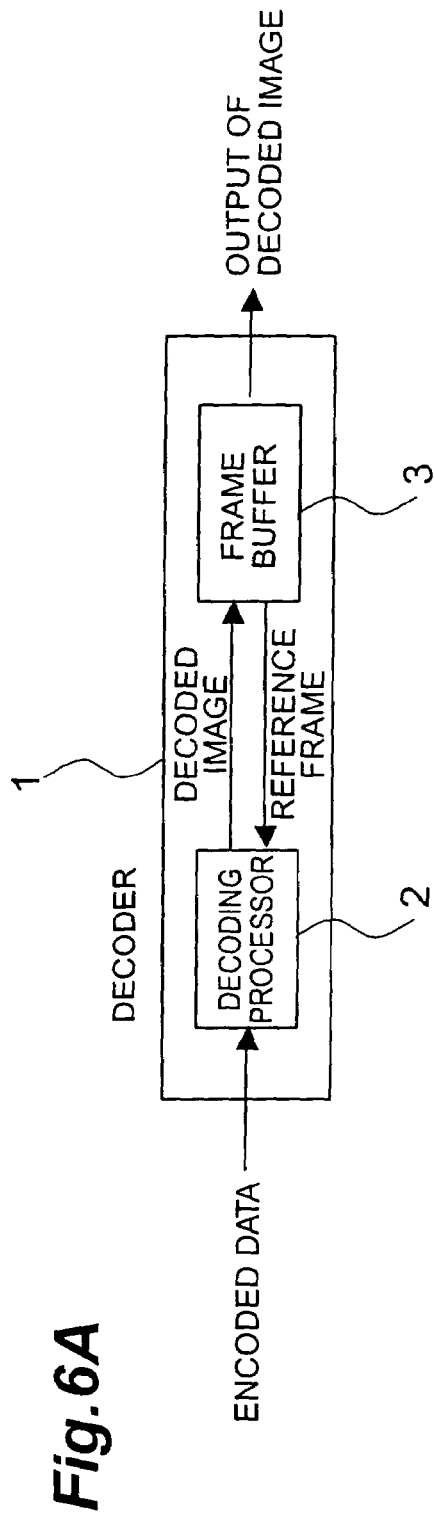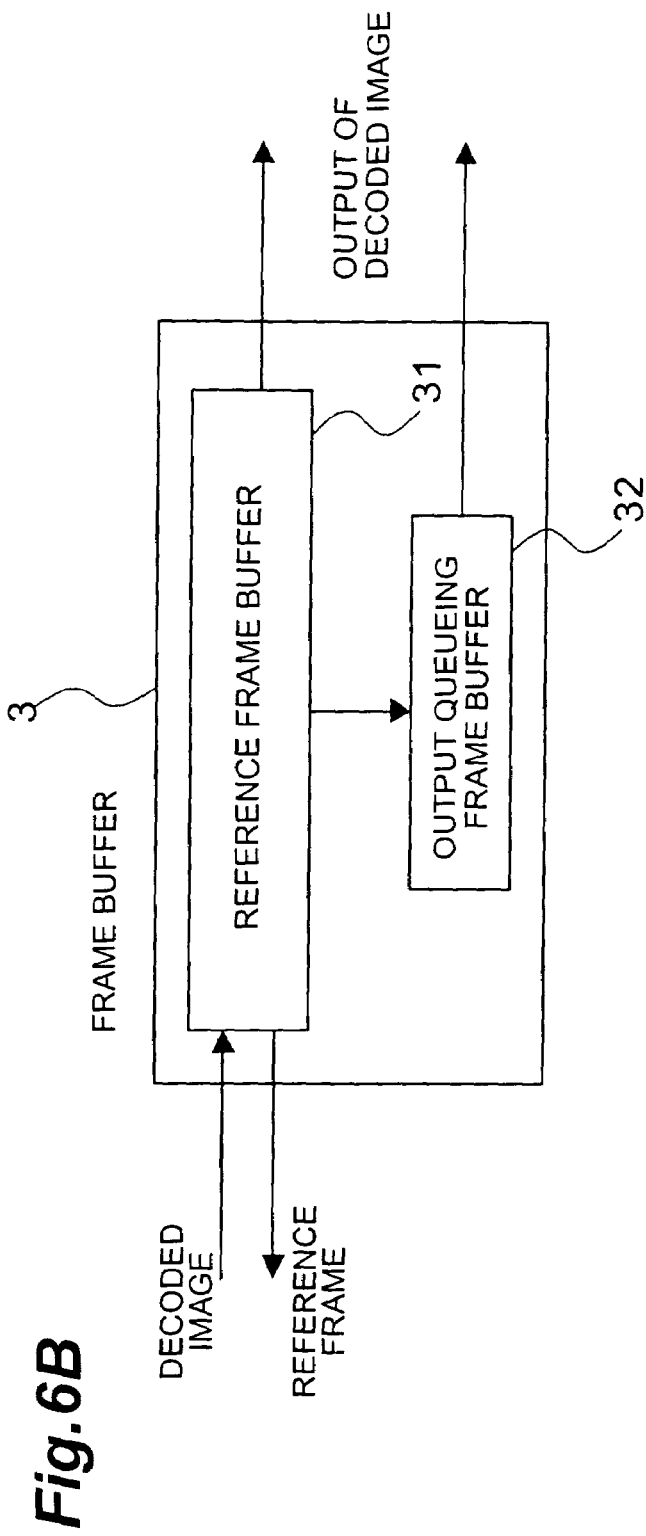
Fig.6A
Fig.6B

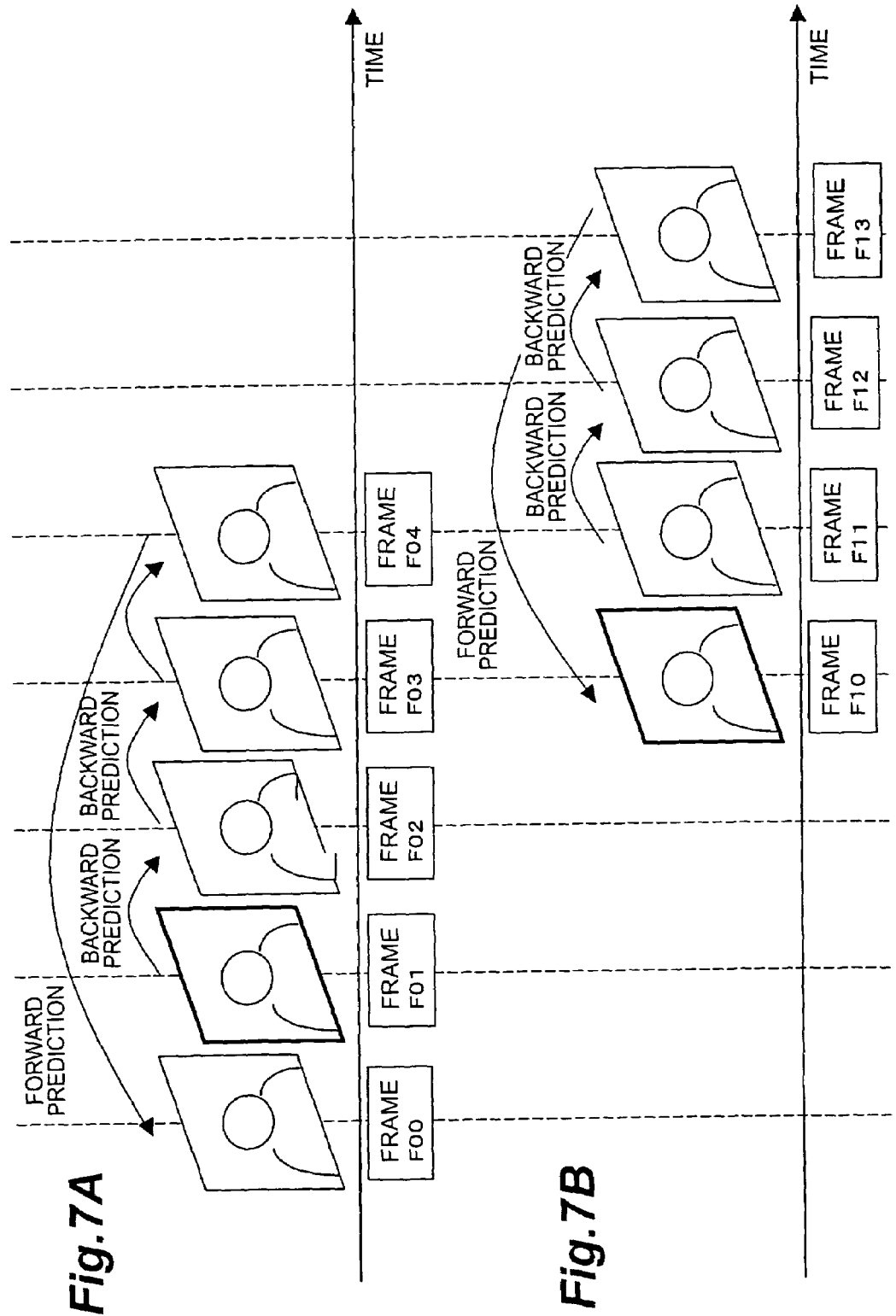

VIDEO ENCODING METHOD, VIDEO DECODING METHOD, VIDEO ENCODING APPARATUS, VIDEO DECODING APPARATUS, VIDEO ENCODING PROGRAM, AND VIDEO DECODING PROGRAM

BACKGROUND OF THE INVENTION

1. Field of the Invention

The present invention relates to a video encoding method, a video decoding method, a video encoding apparatus, a video decoding apparatus, a video processing system, a video encoding program, and a video decoding program.

2. Related Background Art

Conventionally, video signal encoding techniques are used for transmission, storage, and regeneration of video signals. The well-known techniques include, for example, the international standard video coding methods such as ITU-T Recommendation H.263 (hereinafter referred to as "H.263"), ISO/IEC International Standard 14496-2 (MPEG-4 Visual, hereinafter referred to as "MPEG-4"), and so on.

Another known newer encoding system is a video coding method scheduled for joint international standardization by ITU-T and ISO/IEC; ITU-T Recommendation H.264 and ISO/IEC International Standard 14496-10 (Joint Final Committee Draft of Joint Video Specification, hereinafter referred to as "H.26L"). Concerning the general coding techniques used in these video coding methods, reference should be made, for example, to nonpatent Document 1 presented below.

[Nonpatent Document 1]

Basic Technologies on International Image Coding Standards (co-authored by Fumitaka Ono and Hiroshi Watanabe and published Mar. 20, 1998 by CORONA PUBLISHING CO., LTD.)

A motion video signal consists of a series of images (frames) varying little by little with time. For this reason, it is common practice in these video coding methods to implement interframe prediction between a frame retrieved as a target for encoding (current frame) and another frame (reference frame) and thereby reduce temporal redundancy in the video signal.

In this case, where the interframe prediction is carried out between the current frame and a reference frame with smaller difference from the current frame, the redundancy can be reduced more and encoding efficiency can be increased. For this reason, the reference frame can be either a temporally previous frame or a temporally subsequent frame with respect to the current frame. The prediction with reference to the previous frame is referred to as forward prediction, while the prediction with reference to the subsequent frame as backward prediction (cf. FIG. 1). Bidirectional prediction is defined as a prediction in which one is arbitrarily selected out of the two prediction methods is arbitrarily selected, or in which the both methods are used simultaneously.

In general, with use of such bidirectional prediction, a temporally previous frame as a reference frame for forward prediction and a temporally subsequent frame as a reference frame for backward prediction are each stored each in a frame buffer, prior to the current frame.

For example, in decoding of MPEG-4, where the current frame is decoded by bidirectional interframe prediction, a temporally previous frame and a temporally subsequent frame with respect to the current frame are first decoded as either frames decoded by intraframe prediction without use of interframe prediction, or as frames decoded by forward interframe prediction, prior to decoding of the current frame, and they are stored as reference frames into the frame buffer. Thereafter, the current frame is decoded by bidirectional prediction using these two frames thus stored (cf. FIG. 2(a)).

In this case, therefore, the order of decoding times of the temporally subsequent reference frame and the current frame is reverse to the order of output times of the respective decoded images thereof. Each of these frames is attached with information indicating its output time, and thus the temporal order of the frames can be known according to this information. For this reason, the decoded images are outputted in the correct order (cf. FIG. 2(b)). In MPEG-4, the output times are described as absolute values.

Some of the recent video coding methods permit the foregoing interframe prediction to be carried out using multiple reference frames, instead of one reference frame in the forward direction and one reference frame in the backward direction, so as to enable prediction from a frame with a smaller change from the current frame (cf. FIG. 3).

For example, in decoding of H.26L, a plurality of reference frames within the range up to the predetermined maximum number of reference frames are retained in the frame buffer and an optimal reference frame is arbitrarily designated out of them on the occasion of implementing interframe prediction. In this case, where the current frame is decoded as a bidirectionally predicted frame, reference frames are first decoded prior to decoding of the current frame; a plurality of temporally previous frames and a plurality of temporally subsequent frames with respect to the current frame are decoded each as reference frames and retained as reference frames in the frame buffer. The current frame can be predicted from a frame arbitrarily designated as one used for prediction out of those frames (cf. FIG. 4(a)).

In this case, therefore, the order of decoding times of the temporally subsequent reference frames and the current frame becomes reverse to the order of output times thereof. Each of these frames is attached with information indicating its output time or with information indicating the output order, and the temporal order of the frames can be known according to this information. For this reason, the decoded images are outputted in the correct order (cf. FIG. 4(b)). The output times are often described as absolute values. The output order is used where frame intervals are constant.

In the case where the multiple reference frames are also used in backward prediction, as described above, the frames retained in the frame buffer are not always used in backward prediction for frames after the current frame. An example of this case will be described with reference to the predictive structure shown in FIG. 5. Let us assume that the current frame F1 is backward predicted from a temporally subsequent reference frame F2, F2 from F3, and F3 from F4 and that F4 is forward predicted from a temporally previous reference frame F0. Such predictions are carried out as efficient prediction operation, for example, in the case where a change is large between the temporally previous reference frame F0 and the current frame F1, while changes are small between F1 and the temporally subsequent reference frames F2, F3, F4, and a change is relatively small between F0 and F3.

In this case, the current frame F1 is predicted from only the temporally subsequent reference frame F2, and thus F3 and F4 are frames that are not used for interframe prediction at the time of decoding the current frame F1. However, since F3 and F4 are temporally subsequent frames after the current frame F1, they need to be continuously retained before they are outputted as decoded images at their respective output times.

When the temporally subsequent frames are retained for the backward prediction in the frame buffer in this way, such frames are classified into two types, those used as reference frames and those not used as reference frames in the interframe prediction after the current frame. In the description hereinafter, the frames not used as reference frames but retained in the frame buffer before the coming of their output times will be referred to as "output queueing frames."

In order to explain the difference of the frames, schematic illustrations of a configuration of a video decoding device are presented in FIG. 6(a) and FIG. 6(b). As shown in FIG. 6(a), the decoding device 1 is provided with frame buffer 3 for retaining reference frames, and the frame buffer 3 outputs a reference frame to decoding processor 2 in execution of interframe prediction. In this case, where a plurality of reference frames are used in backward prediction as described above, the frame buffer retains both the reference frames and output queueing frames and, from a logical aspect, as shown in FIG. 6(b), there exist an area for storing frames continuously retained as reference frames for a fixed time and also outputted to the decoding processor 2, and an area for storing frames not outputted to the decoding processor 2 but continuously retained before outputted as decoded images at output times of the respective frames.

Incidentally, in the case of the multiple reference frames being used, for example, if there is a frame having a peculiar feature in a certain moving picture and having large changes from the other frames, no effective prediction can be expected even if that frame is kept retained as a reference frame. Therefore, the interframe prediction can be performed more efficiently in certain cases by stopping retaining such frames as reference frames and allowing the frame buffer to retain other frames by just that much. Conversely, in the case where a frame has a typical feature in a certain moving picture and has small changes from the other frames, the interframe prediction can be expected to be carried out efficiently for many frames if such a frame is retained as a reference frame in the frame buffer for a long period, regardless of the temporal distance from the current frame.

In order to substantialize such eclectic operation of reference frames, it is conceivable to announce eclectic information of the reference frames by encoded data. For example, in H.26L, Memory Management Control Operation (MMCO) commands are defined. The MMCO commands include, for example, definitions of a Reset command capable of providing an instruction to eliminate use of all the reference frames retained in the frame buffer, and other commands, and it is possible to arbitrarily provide an instruction to choose any frame to be retained as a reference frame in the frame buffer as occasion demands.

For starting decoding from the middle of encoded data in order to make random access on a moving picture, necessary conditions are that a start frame to be decoded is a frame encoded by intraframe prediction without use of interframe prediction from another frame and that frames after the start frame do not use any previous frame before the decoding-start frame, as a reference frame, i.e., an instruction to eliminate use of all the reference frames retained in the frame buffer needs to be given prior to the decoding of the decoding-start frame.

For example, in H.26L, an Instantaneous Decoder Refresh (IDR) picture is defined in order to clearly specify such a state. With the IDR picture, use is eliminated of all the previous reference frames before decoding of the IDR picture and interframe predictions for frames thereafter are those not referring to the frames before the IDR picture. This permits decoding to be carried out in the middle of encoded data, like in random access, without facing the problem of presence/absence of the reference frame when decoding start from an IDR picture.

SUMMARY OF THE INVENTION

In the case where a plurality of reference frames are used in backward interframe prediction, as described above, the plurality of reference frames can be efficiently handled by providing a means for controlling retention of the reference frames in the frame buffer. On the other hand, this frame buffer retains both the reference frames used for interframe prediction and the output queueing frames retained before the coming of their output times, but no consideration was given to control of such output queueing frames in the conventional means for controlling the retention of reference frames. It posed a problem that the output queueing frames which are not scheduled for output occupy the frame buffer for a long period of time.

For this reason, if the control of output queueing frames is not properly carried out, there will arise a problem that output of decoded images cannot be uniquely handled, or the like.

For example, let us suppose that switching of video is effected at the time of F03 from a moving picture consisting of encoded data F00-F04 in FIG. 7(a) to a moving picture consisting of encoded data F10-F13 in FIG. 7(b). This can occur, for example, in the case where encoded data stored for editing of motion video is switched in frame units, or in the case where in broadcast type video communication, certain encoded data corresponding to one channel is switched to another encoded data corresponding to another channel.

In this case, F10 needs to be an IDR picture, which eliminates use of all the reference frames retained in the frame buffer, prior to the decoding of F10, and which permits the decoding of frames after F10 to be carried out without any problem. However, the frames which are eliminated from use in this case are reference frames, and thus unique handling is not allowed if F03 and F04 are not reference frames but output queueing frames. Namely, it is not clear in the case of switching to F10 whether F03 and F04 are frames to be continuously retained in the frame buffer and to be outputted, or frames to be handled as frames eliminated from use prior to the decoding of F10. Accordingly, which frame should be outputted as a decoded image in this case is not uniquely determined.

An object of the present invention is, therefore, to clearly define handling of frames retained in the frame buffer in use of multiple reference frames when using multiple reference frame in backward interframe prediction.

In order to solve the above problem, a video encoding method according to the present invention is a video encoding method for video encoding apparatus to implement backward interframe prediction from a temporally subsequent frame, the video encoding method comprising: outputting information indicating that an option to eliminate use of a decoded image of the temporally subsequent frame was chosen.

In the video encoding method according to the present invention, preferably, the information is information providing an instruction to eliminate use of every frame, about the decoded image of the temporally subsequent frame.

In the video encoding method according to the present invention, preferably, the information is information providing an instruction to eliminate use of every frame not used as a reference frame for backward prediction, about the decoded image of the temporally subsequent frame.

In the video encoding method according to the present invention, preferably, the information includes information indicating an output time about a decoded image of a frame use of which is eliminated.

A video decoding method according to the present invention is a video decoding method for video decoding apparatus to implement backward interframe prediction from a temporally subsequent frame, the video decoding method comprising: in conjunction with input of information for eliminating use of a decoded image of the temporally subsequent frame, avoiding outputting the decoded image of the frame on the basis of the information.

In the video decoding method according to the present invention, preferably, the information is information providing an instruction to eliminate use of every frame, about the decoded image of the temporally subsequent frame.

In the video decoding method according to the present invention, preferably, the information is information providing an instruction to eliminate use of every frame not used as a reference frame for backward prediction, about the decoded image of the temporally subsequent frame.

In the video decoding method according to the present invention, preferably, the information includes information indicating an output time about a decoded image of a frame use of which is eliminated.

A video encoding apparatus according to the present invention is a video encoding apparatus for implementing backward interframe prediction from a temporally subsequent frame, the video encoding apparatus being configured to: output information indicating that an option to eliminate use of a decoded image of the temporally subsequent frame was chosen.

In the video encoding apparatus according to the present invention, preferably, the information is information providing an instruction to eliminate use of every frame, about the decoded image of the temporally subsequent frame.

In the video encoding apparatus according to the present invention, preferably, the information is information providing an instruction to eliminate use of every frame not used as a reference frame for backward prediction, about the decoded image of the temporally subsequent frame.

In the video encoding apparatus according to the present invention, preferably, the information includes information indicating an output time about a decoded image of a frame use of which is eliminated.

A video decoding apparatus according to the present invention is a video decoding apparatus for implementing backward interframe prediction from a temporally subsequent frame, the video decoding apparatus being configured to: in conjunction with input of information for eliminating use of a decoded image of the temporally subsequent frame, avoid outputting the decoded image of the frame on the basis of the information.

In the video decoding apparatus according to the present invention, preferably, the information is information providing an instruction to eliminate use of every frame, about the decoded image of the temporally subsequent frame.

In the video decoding apparatus according to the present invention, preferably, the information is information providing an instruction to eliminate use of every frame not used as a reference frame for backward prediction, about the decoded image of the temporally subsequent frame.

In the video decoding apparatus according to the present invention, preferably, the information includes information indicating an output time about a decoded image of a frame use of which is eliminated.

A video encoding program according to the present invention is a video encoding program for video encoding apparatus as a computer for implementing backward interframe prediction from a temporally subsequent frame, the video encoding program letting the video encoding apparatus substantialize: a function of outputting information indicating that an option to eliminate use of a decoded image of the temporally subsequent frame was chosen.

In the video encoding program according to the present invention, preferably, the information is information providing an instruction to eliminate use of every frame, about the decoded image of the temporally subsequent frame.

In the video encoding program according to the present invention, preferably, the information is information providing an instruction to eliminate use of every frame not used as a reference frame for backward prediction, about the decoded image of the temporally subsequent frame.

In the video encoding program according to the present invention, preferably, the information includes information indicating an output time about a decoded image of a frame use of which is eliminated.

A video decoding program according to the present invention is a video decoding program for video decoding apparatus as a computer for implementing backward interframe prediction from a temporally subsequent frame, the video decoding program letting the video decoding apparatus substantialize: a function of, in conjunction with input of information for eliminating use of a decoded image of the temporally subsequent frame, avoiding outputting the decoded image of the frame on the basis of the information.

In the video decoding program according to the present invention, preferably, the information is information providing an instruction to eliminate use of every frame, about the decoded image of the temporally subsequent frame.

In the video decoding program according to the present invention, preferably, the information is information providing an instruction to eliminate use of every frame not used as a reference frame for backward prediction, about the decoded image of the temporally subsequent frame.

In the video decoding program according to the present invention, preferably, the information includes information indicating an output time about a decoded image of a frame use of which is eliminated.

According to these aspects of the invention, the encoding operation is configured to output the information providing the instruction to eliminate use of output queueing frames to be outputted as decoded images, and the decoding operation is configured to retrieve this information and output neither of the output queueing frames. This prevents an unnecessary decoded image from being outputted in decoding of encoded data after edit or in decoding after random access on encoded data, and also prevents a necessary decoded image output from being deleted, conversely. As a consequence, an appropriate decoded image output can be obtained.

Similar effect can also be achieved with construction of a video processing system comprising the foregoing video encoding apparatus and the foregoing video decoding apparatus wherein the video decoding apparatus decodes data encoded by the video encoding apparatus.

A video encoding apparatus according to the present invention is a video encoding apparatus comprising: input means for effecting input of an image as a target for encoding; encoding means for encoding the image to generate encoded data; image storage means for storing an image regenerated after encoded by the encoding means; and buffer management means for managing every image stored in the image storage means, wherein, on the occasion of encoding an image (IDR image) encoded without reference to any other image, the buffer management means outputs along with the encoded data, a flag (no_output_of_prior_pics_flag) indicating whether use is eliminated of every image previously stored in the image storage means. For example, the video encoding apparatus outputs the flag of "1" in the case of eliminating use of every image or outputs the flag of "0" in the other case, along with the encoded data.

In the video encoding apparatus according to the present invention, preferably, the encoding means implements backward interframe prediction from a temporally subsequent frame, and, on the occasion of encoding the image (IDR image) encoded without reference to any other image, the buffer management means deletes a decoded image of every temporally subsequent frame previously stored in the image storage means.

A video decoding apparatus according to the present invention is a video decoding apparatus comprising: input means for effecting input of image data containing encoded data of an encoded image, and an image output instruction flag added to the encoded data; decoding means for decoding the encoded data to generate a regenerated image; image storage means for storing the regenerated image; and buffer management means for managing every regenerated image stored in the image storage means, wherein the buffer management means deletes every image stored in the image storage means, in accordance with the image output instruction flag corresponding to an image (IDR image) encoded without reference to any image stored in the image storage means.

In the video decoding apparatus according to the present invention, preferably, where the image output instruction flag is "0," use is eliminated of every reference image in a buffer, and where the flag is "1," every reference image and every output queueing image in the buffer are deleted.

A video encoding method according to the present invention is a video encoding method comprising: an input step wherein a video encoding apparatus effects input of an image as a target for encoding; an encoding step wherein the video encoding apparatus encodes the image to generate encoded data; an image storage step wherein the video encoding apparatus stores an image regenerated after encoded in the encoding step, into image storage means; and a buffer management step wherein the video encoding apparatus manages every image stored in the image storage means, wherein in the buffer management step, on the occasion of encoding an image encoded without reference to any other image, the video encoding apparatus outputs along with the encoded data, a flag indicating whether use is eliminated of every image previously stored in the image storage means.

In the video encoding method according to the present invention, preferably, the encoding step is configured so that the video encoding apparatus performs backward interframe prediction from a temporally subsequent frame, and the buffer management step is configured so that, on the occasion of encoding the image encoded without reference to any other image, the video encoding apparatus deletes a decoded image of every temporally subsequent frame previously stored in the image storage means.

A video decoding method according to the present invention is a video decoding method comprising: an input step wherein a video decoding apparatus effects input of image data containing encoded data of an encoded image, and an image output instruction flag added to the encoded data; a decoding step wherein the video decoding apparatus decodes the encoded data to generate a regenerated image; an image storage step wherein the video decoding apparatus stores the regenerated image into image storage means; and a buffer management step wherein the video decoding apparatus manages every regenerated image stored in the image storage means, wherein in the buffer management step, the video decoding apparatus deletes every image stored in the image storage means, in accordance with the image output instruction flag corresponding to an image encoded without reference to any image stored in the image storage means.

In the video decoding method according to the present invention, preferably, the video decoding apparatus eliminates use of every reference image in the buffer when the image output instruction flag is "0," or deletes every reference image and every output queueing image in the buffer when the flag is "1."

A video encoding program according to the present invention is a video encoding program for letting a video encoding apparatus substantialize: a function of effecting input of an image as a target for encoding; a function of encoding the image to generate encoded data; a function of storing an image regenerated after encoded, into image storage means; a function of managing every image stored in the image storage means; and a function of outputting along with the encoded data, a flag indicating whether use is eliminated of every image previously stored in the image storage means, on the occasion of encoding an image encoded without reference to any other image.

In the video encoding program, preferably, the video encoding apparatus is made to further substantialize a function of implementing backward interframe prediction from a temporally subsequent frame, and a function of deleting a decoded image of every temporally subsequent frame previously stored in the image storage means, on the occasion of encoding the image encoded without reference to any other image.

A video decoding program according to the present invention is a video decoding program for letting a video decoding apparatus substantialize: a function of effecting input of image data containing encoded data of an encoded image, and an image output instruction flag added to the encoded data; a function of decoding the encoded data to generate a regenerated image; a function of storing the regenerated image into image storage means; a function of managing every regenerated image stored in the image storage means; and a function of deleting every image stored in the image storage means, in accordance with the image output instruction flag corresponding to an image encoded without reference to any image stored in the image storage means.

In the video decoding program according to the present invention, preferably, the video decoding apparatus is made to further substantialize a function of eliminating use of every reference image in the buffer when the image output instruction flag is "0," or deleting every reference image and every output queueing image in the buffer when the flag is "1."

The present invention will become more fully understood from the detailed description given herein below and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 2(a) is a diagram showing an example in which the current frame is decoded by bidirectional prediction using two frames. FIG. 2(b) is a diagram showing an example in which the order of decoding times of the temporally subsequent reference frame and the current frame is reverse to the order of output times of their respective decoded images.

FIG. 4(a) is a diagram showing an example in which interframe prediction with multiple reference frames within the range up to the predetermined maximum number of reference frames is carried out. FIG. 4(b) is a diagram showing an example in which the order of decoding times of the multiple temporally subsequent reference frames and the current frame is reverse to the order of output times of their respective decoded images.

FIG. 5 is a diagram showing the predictive structure in the case where the frames retained in the frame buffer are not used for backward prediction after the current frame.

FIG. 6(a) is a diagram schematically showing the configuration of the video decoding device. FIG. 6(b) is a diagram schematically showing the configuration of the frame buffer.

FIG. 7(a) is a diagram showing an example of a moving picture before switching consisting of encoded data. FIG. 7(b) is a diagram showing a moving picture after switching consisting of encoded data.

DESCRIPTION OF THE PREFERRED EMBODIMENTS

Embodiments of the present invention will be described below in detail with reference to the drawings.

The description will be given on the presumption that the encoding and decoding operations are implemented on the basis of H.26L and that portions without particular description in the operation of video coding are pursuant to the operation in H.26L.

Figure 1:
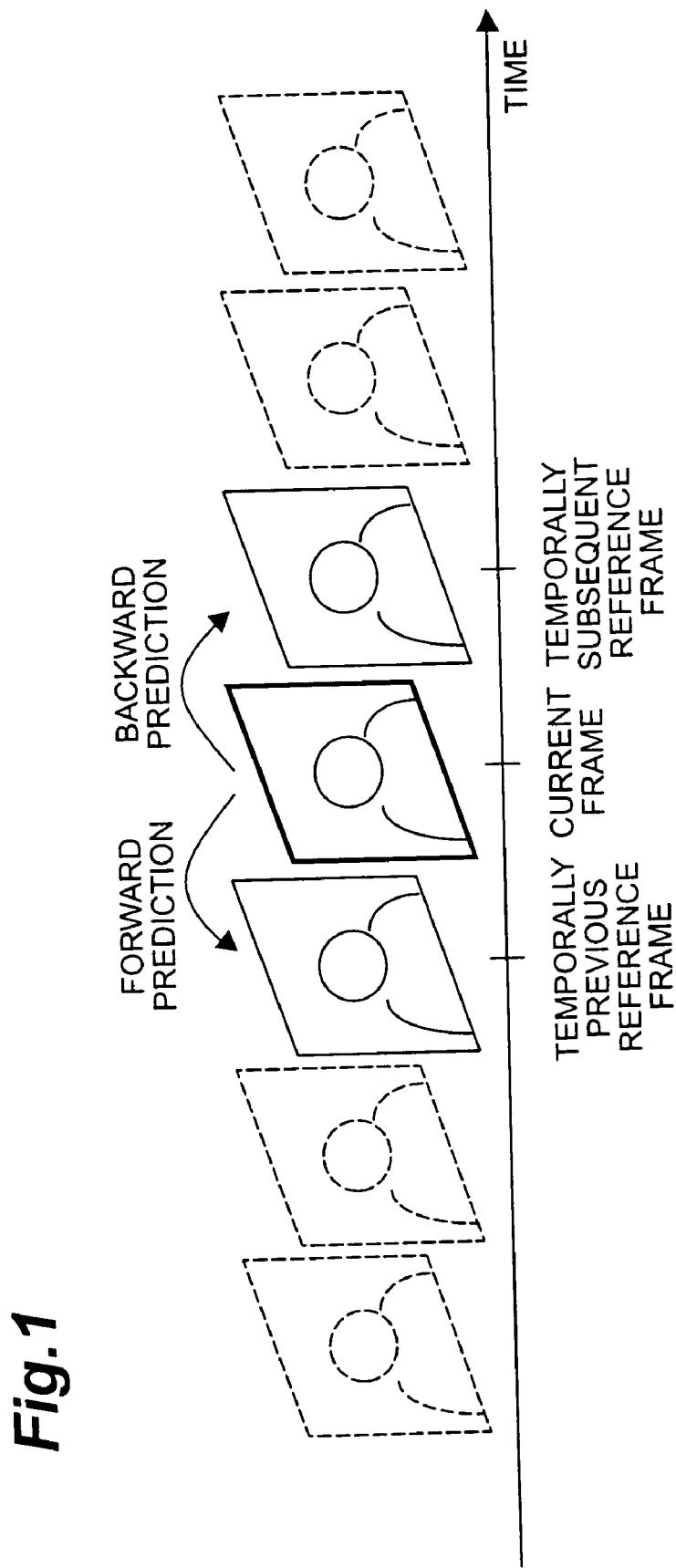
FIG. 1 is a diagram for explaining the forward prediction and backward prediction in interframe prediction.
Figure 3:
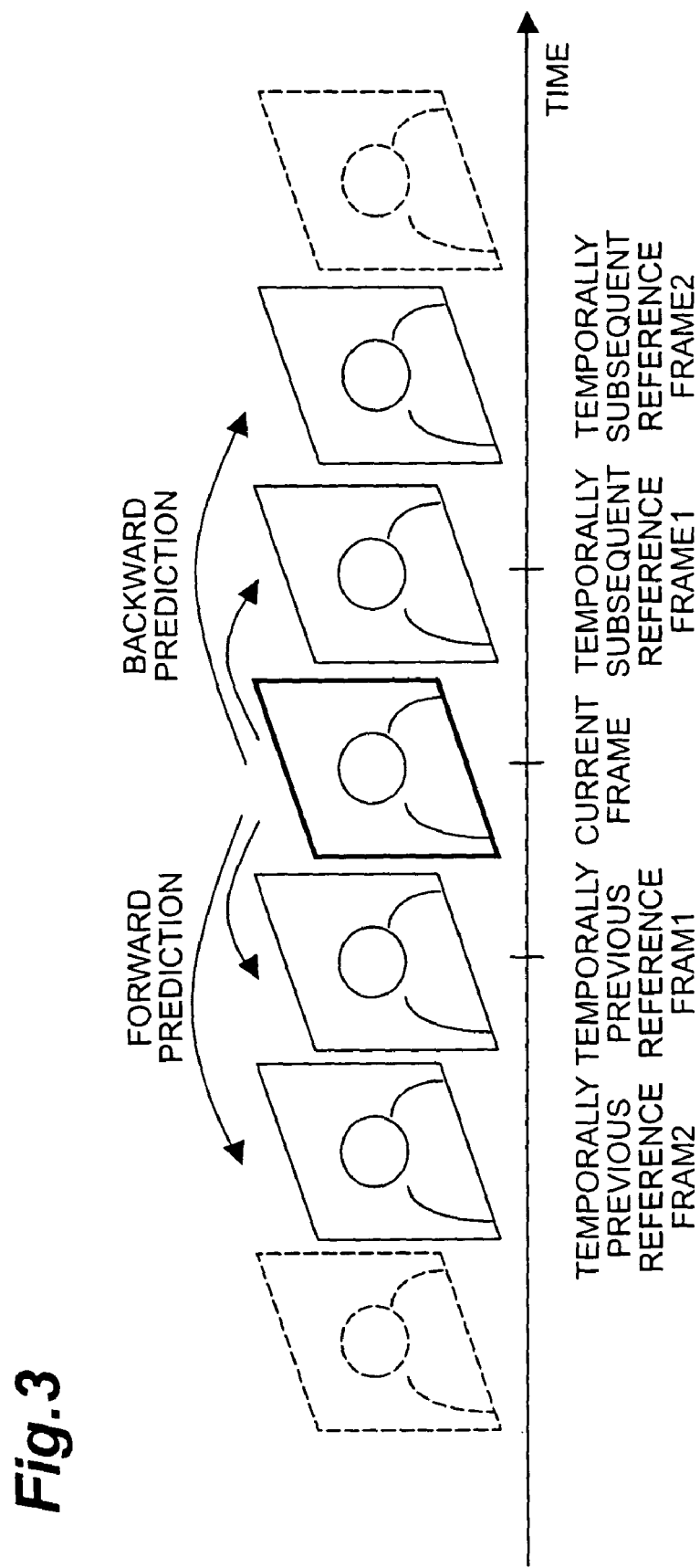
FIG. 3 is a diagram for explaining the forward prediction and backward prediction with use of multiple reference frames.
Figure 8:
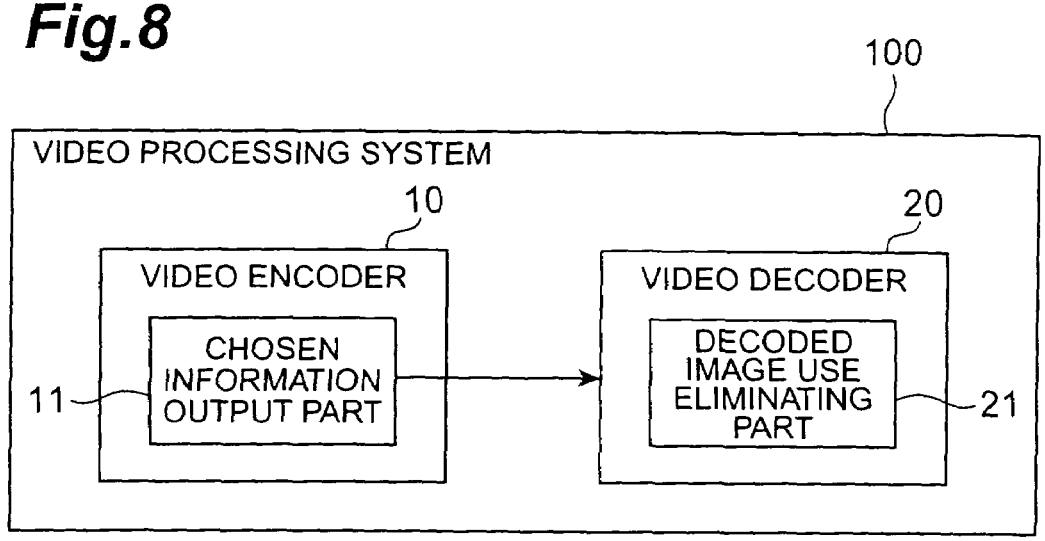
FIG. 8 is a block diagram showing the functional configuration of the video processing system according to the present invention.

First, a configuration of a video processing system according to the present invention will be described. FIG. 8 is a block diagram showing a functional configuration of video processing system 100. As shown in FIG. 8, the video processing system 100 is comprised of video encoding device 10 and video decoding device 20. The video encoding device 10 and video decoding device 20 are configured to perform the backward interframe prediction from a temporally subsequent frame.

The detailed processing will be described later, but the video encoding device 10 is provided with chosen information output part 11, and the chosen information output part 11 outputs information indicating that an option to eliminate use of a decoded image of a temporally subsequent frame was chosen, to the video decoding device 20.

The video decoding device 20 is provided with decoded image use eliminating part 21, and the decoded image use eliminating part 21 is configured so that, in conjunction with input of information for eliminating use of a decoded image of a temporally subsequent frame from the video encoding device 10, the decoded image use eliminating part 21 avoids outputting the decoded image of the frame on the basis of the information.

The above information is, for example, information providing an instruction to eliminate use of every frame, for each decoded image of a temporally subsequent frame. For example, this information is information providing an instruction to eliminate use of every frame not used as a reference frame for backward prediction, for each decoded image of a temporally subsequent frame. Furthermore, for example, this information includes information indicating an output time about a decoded image of a frame use of which is eliminated.

Subsequently, a video encoding method and a video decoding method according to the present invention will be described. In the present embodiment, information capable of providing an instruction to eliminate use of a frame retained in the frame buffer is defined, and it is clearly defined for each of reference frames and output queueing frames.

In the present embodiment the information is defined in the NAL unit syntax which carries the information about NAL (Network Abstraction Layer), the units for transmission encoded data in H.26L. Specifically, it is defined as a type that is announced by a NAL unit type included in the NAL unit syntax.

In the present embodiment, it is first regarded that with each conventional IDR picture an instruction is provided as one to eliminate use of only every reference frame retained in the frame buffer. Namely, the definition here is that use of any output queueing frame retained in the frame buffer is not eliminated with an IDR picture.

Then an Instant Buffer Refresh picture (hereinafter referred to as an "IBR picture") is defined as a new picture different from the IDR picture. The IBR picture is defined as a picture that provides an instruction to eliminate use of every output queueing frame, in addition to the definition of the IDR picture providing the instruction to eliminate use of only every reference frame retained in the frame buffer. Namely, when the current frame is determined to be an IBR picture, use of every reference frame and every output queueing frame retained in the frame buffer is eliminated, prior to decoding of the current frame.

In the encoding, the video encoding device 10 provides an instruction of such an IBR picture in the case as described below. For example, in the case where an IDR picture used to be designated as a random access point and where output queueing frames prior thereto are not desired to be retained, regardless of delay by backward prediction, the pertinent frame can be designated as an IBR picture.

In the decoding, where the current frame is an IBR picture, the video decoding device 20 eliminates use of every reference frame and every output queueing frame in the frame buffer, prior to decoding of the current frame, and regards that they will not be used for the interframe prediction and for output of their decoded images after the current frame.

The IBR picture may also be configured to eliminate use of only limited output queueing frames to be unused, instead of eliminating the use of all the output queueing frames.

Then the device may be arranged to determine whether use of each frame is to be eliminated, using a decoded image output time attached to the IBR picture, and to eliminate use of only output queueing frames having their respective output times greater than the attached output time.

As another example, the system may also be configured to convey an output time separately, eliminate use of only output queueing frames having their output times greater than the conveyed output time, and designate each unnecessary output queueing frame, based on a decoded image output time correlated with that frame.

In this case, there arises a need for a syntax to convey the output time, and it may be configured, for example, as a syntax that exists only with the NAL unit type indicating the IBR picture in the NAL unit syntax and that conveys the time along with the IBR picture. For example, we can define "latest_output_time" which is conveyed subsequent to the NAL unit type where the NAL unit type indicates the IBR picture. Here the latest_output_time is assumed to use the same time unit used in the other syntaxes indicating the time in H.26L and to indicate a maximum delay time by the time unit of 90 kHz. It is also regarded that a numeral indicated in the time unit is encoded by 32-bit unsigned fixed-length codes and encoded data is then transmitted.

In the decoding, when receiving the latest_output_time, the video decoding device 20 eliminates use of only frames whose decoded image output times are greater than the latest_output_time, among the output queueing frames retained in the frame buffer.

In the case where the latest_output_time is used in this way, the system may also be configured so that a flag is further conveyed before it and the syntax with the latest_output_time is used only when there is an indication by the flag. In this case, it is possible to define an option to eliminate use of all the output queueing frames when the latest_output_time is omitted.

In the present embodiment the IBR picture is defined as a picture different from the IDR picture, but it is also possible to define a flag attached to the IDR picture and indicating how to handle the output queueing frames (no_output_of_prior_pics_flag), instead of defining the new picture like the IBR picture, and provide the IDR picture with the same definition as the IBR picture, because the difference between the IDR picture and the IBR picture is the difference in how to handle the output queueing frames retained in the frame buffer.

Namely, just like the aforementioned definition, the IDR picture is defined as a picture providing an instruction to eliminate use of only all the reference frames retained in the frame buffer but not to eliminate use of the output queueing frames. In this case, a flag attached to the IDR picture is separately conveyed for the IDR picture, and with an indication by the flag (no_output_of_prior_pics_flag=1), the IDR picture, similar to the aforementioned IBR picture, is handled as one providing an instruction to eliminate use of all the output queueing frames, in addition to all the reference frames retained in the frame buffer. This announcement makes it feasible to provide the instruction to eliminate use of the output queueing frames as well, without defining any new picture.

The present embodiment will be further described with reference to FIGS. 10-12.

Figure 10:
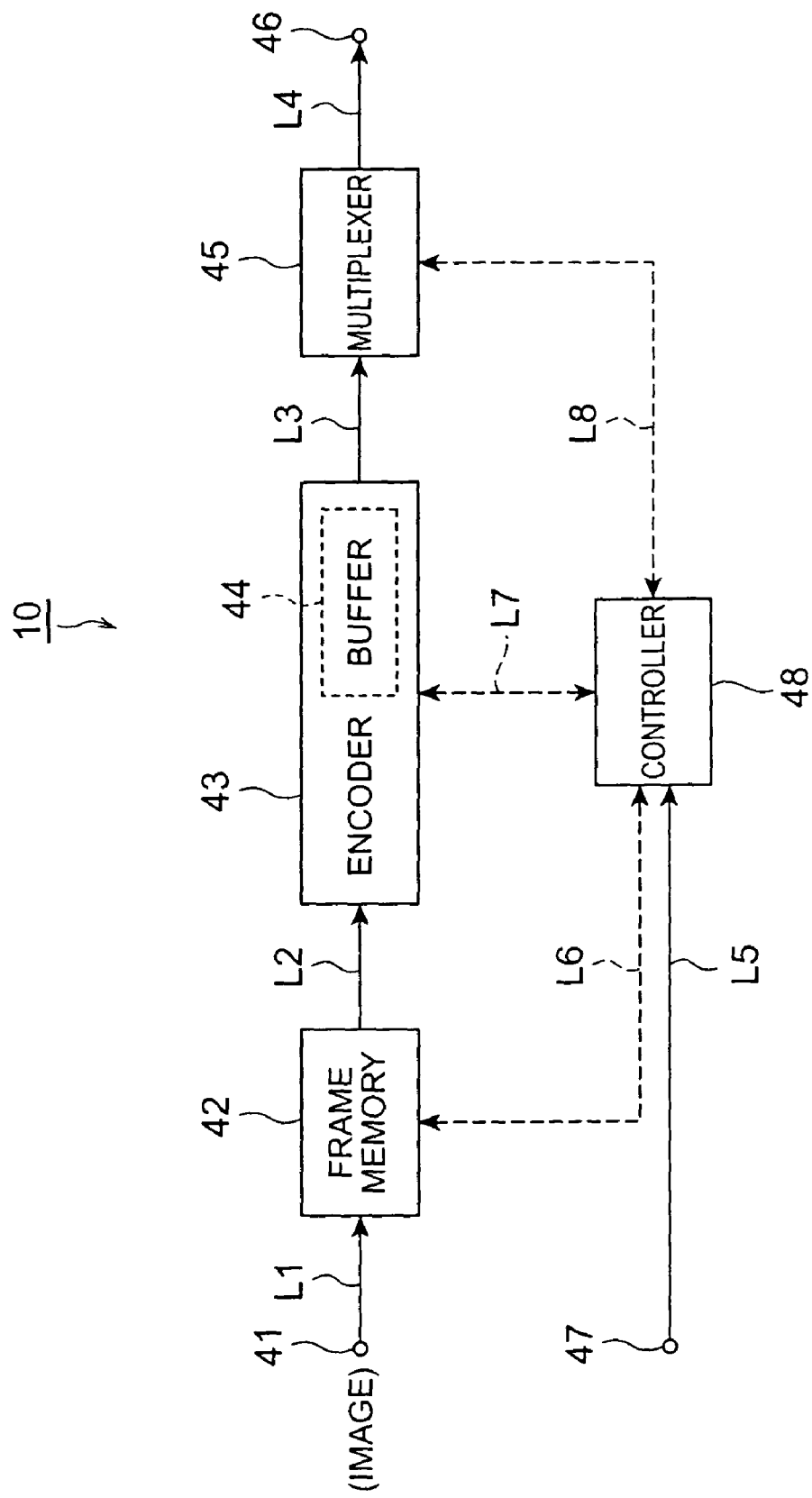
FIG. 10 is a block diagram showing the configuration of the video encoding device according to the present invention.

FIG. 10 is a block diagram showing the configuration of video encoding device 10 in the present embodiment. The conditions for video coding are entered through input terminal 47. In general, the encoding conditions are selected or entered through a keyboard. The encoding conditions are, for example, the size of the image as a target for encoding, the frame rate, and the bit rate. Further encoding conditions include a predictive reference structure of video and a capacity of buffer 44.

The predictive reference structure of video is, for example, timing of encoding an input image as an IDR image, an image referred to by a predictively encoded image, or the like. The capacity of buffer 44 is, for example, the number of images temporarily stored as reference images. These conditions may be set so as to vary with time. The encoding conditions thus entered are stored in controller 48.

With a start of an encoding operation, the controller 48 outputs the encoding conditions to encoder 43, where the encoding condition are set. On the other hand, an image as a target for encoding is entered through input terminal 41, is then supplied via frame memory 42 to encoder 43, and thereafter is encoded. Since the order of images is switched on the occasion of backward prediction, the input image is temporarily stored in the frame memory 42.

The encoder 43 encodes the image on the basis of the algorithm of H.26L. The encoded image is sent to multiplexer 45 to be multiplexed with other related information and thereafter the multiplexed data is outputted through output terminal 46. The image used for prediction is reproduced by encoder 43 and then is stored as a reference image for encoding of the next image, into the buffer 44.

Figure 11:
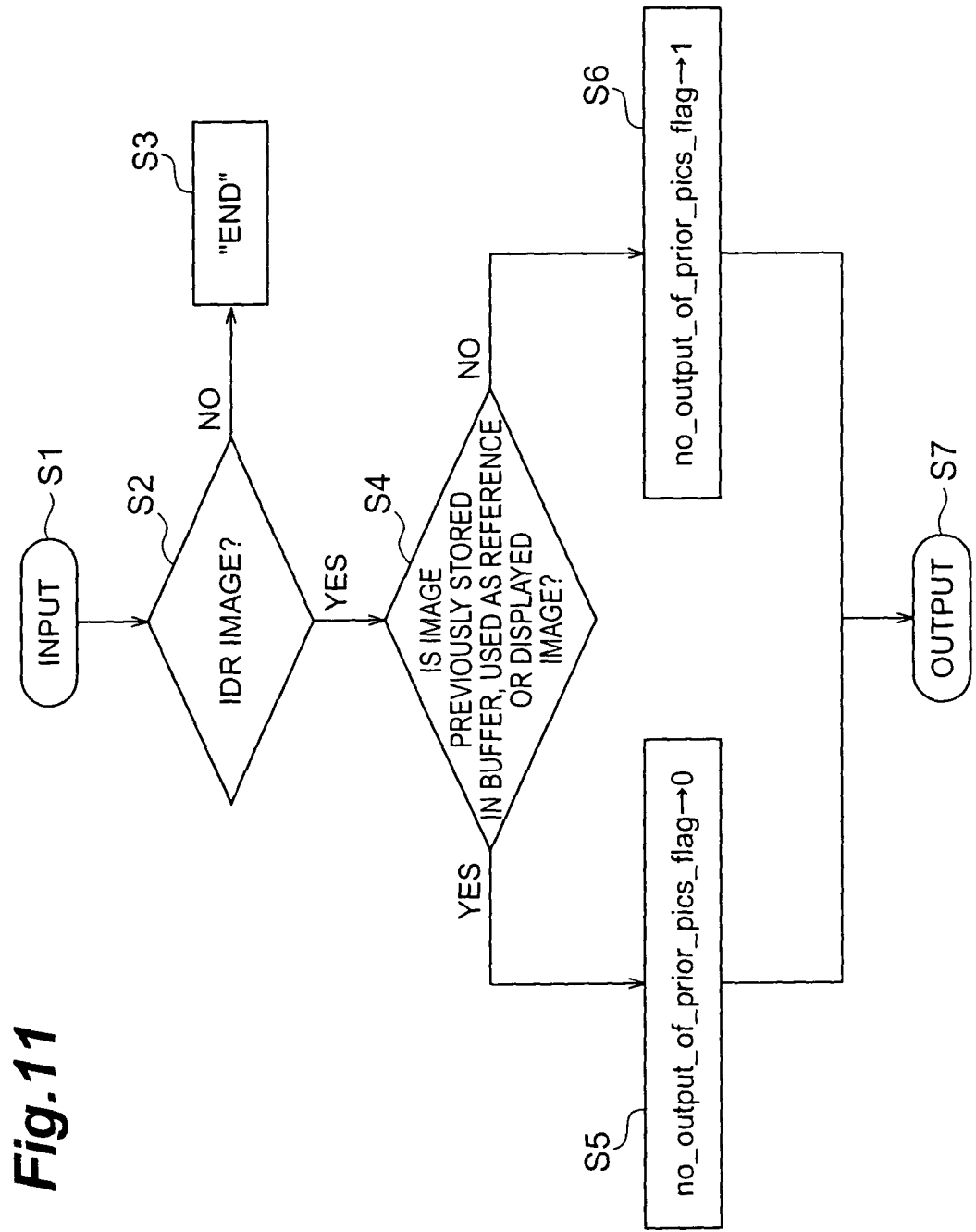
FIG. 11 is a flowchart for explaining the process in which the controller determines no_output_of_prior_pics_flag.

FIG. 11 is a flowchart for explaining a process in which the controller 48 determines no_output_of_prior_pics_flag. This process is executed for each of images constituting a video as a target for encoding. The first step S1 is to effect input of the encoding conditions for an image as a target for encoding (whether the image is to be encoded as an IDR image) and input of information about whether a regenerated image previously stored in the buffer 44 is used as a reference image or as a displayed image. Such information is separately managed by the controller 48.

S2 is to determine whether the image as a target for encoding is an IDR image. When the result of the determination is that the image is not an IDR image (S2; NO), this process is ended (S3). When the image is an IDR image (S2; YES), the flow moves to S4. S4 is to determine whether the image previously stored in the buffer 44 are used as reference images or as a displayed images.

When the result of the above determination is that the images previously stored in the buffer 44 are used as a reference image or as a displayed image (S4; YES), no_output_of_prior_pics_flag is set to "0" (S5). On the other hand, when it is not used neither as a reference image nor as a displayed image (S4; NO), no_output_of_prior_pics_flag is set to "1" (S6). The flag of no_output_of_prior_pics_flag thus set is supplied through bus L8 to the multiplexer 45, and thereafter is added to encoded data of the corresponding image, and the data is sent out through output terminal 46

(S7). When at S6 no_output_of_prior_pics_flag is set to "1," the controller 48 outputs a command to delete all the images stored in the buffer 44, through L7.

Figure 12:
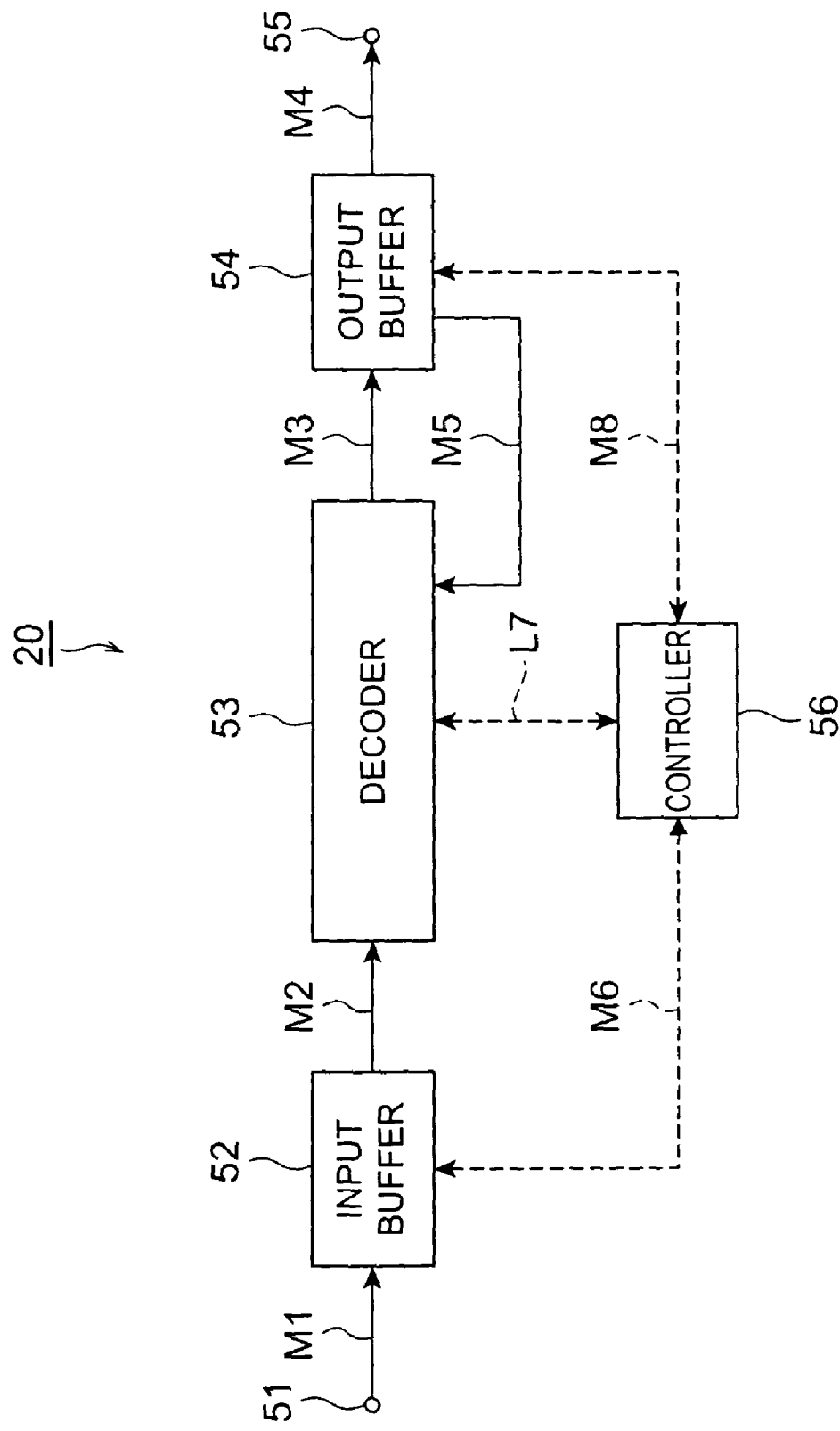
FIG. 12 is a block diagram showing the configuration of the video decoding device according to the present invention.

FIG. 12 is a block diagram showing the configuration of the video decoding device 20 in the present embodiment. Data to be decoded is entered through input terminal 51. This data is the image data of each frame encoded by the video encoding device 10. When this data is an IDR image, no_output_of_prior_pics_flag is multiplexed therewith. The input data is stored in input buffer 52. At a predetermined time, data of one frame is fed from input buffer 52 to decoder 53 in response to an instruction from controller 56 and decoding thereof is initiated according to the algorithm of H.26L.

A decoded image is once stored in output buffer 54. The image stored in the output buffer 54 is fed back via bus MS to decoder 53 and thereafter is used as a reference image for decoding of the next image. On the other hand, the data of no_output_of_prior_pics_flag added to the IDR image decoded by decoder 53 is fed to controller 56.

The controller 56 refers to the value of no_output_of_prior_pics_flag ("0" or "1") and controls the output buffer 54, based thereon. Specifically, when no_output_of_prior_pics_flag is "1," the reference images and display queueing images both become unnecessary and thus the controller 56 outputs a command to delete all the images stored in the output buffer 54, via bus M8. When no_output_of_prior_pics_flag is "0" on the other hand, the image corresponding thereto is an IDR image and the controller 56 eliminates use of all the images used for reference (reference images) and deletes them from the output buffer 54. However, the display queueing images are not deleted. Each display queueing image is displayed at its time on a display device.

The present embodiment described the example in which the present invention was substantialized on the basis of H.26L, but the video encoding methods to which the present invention can be applied are not limited to H.26L but include a variety of video encoding methods using the backward interframe prediction.

Furthermore, the present embodiment was configured so that the syntax for conveying no use of output queueing frames was defined as an additional definition of the NAL unit type announced in the NAL unit syntax and so that the syntax by the fixed-length codes was added for conveying the output time, but it is a matter of course that the definitions and syntaxes for conveying thereof are not limited to these.

Variable-length codes may also be used instead of the fixed-length codes for the announcement of output time, and the unit of output time can be any other unit than 90 kHz; for example, the unit of output time may be based on the time unit defined in num_units_in_tick and time_scale subsidiarily announced as Video Usability Information (VUI) in H.26L.

It can also be conveyed by one of various syntaxes that can convey information for application in frame units, as well as the NAL unit syntax. For example, in H.26L, a syntax may be added into the Supplemental Enhancement Information Message syntax.

As another means, it is also possible to extend the memory management control operation (MMCO) commands defined for control of reference frames in H.26L. In this case, since the Reset command defined as an MMCO command defines the same operation as the IDR picture in the foregoing NAL unit type, it is also possible, for example, to define an output queueing frame reset (Reordering Buffer Reset) command, as in the case of the definition in the NAL unit type. The definition of operation by this command may be determined to be similar to the definition of the operation with the IBR picture in the NAL unit type.

When another video coding method is applied, it is possible to use a syntax for conveying information applied to frame units in that coding method. It may also be announced outside encoded data in the video coding method, as in the case of ITU-T Recommendation H.245 utilized for announcement of control information in communication using H.263.

Lastly, a video encoding program and a video decoding program according to the present invention will be described with reference to FIG. 9.

Figure 9:
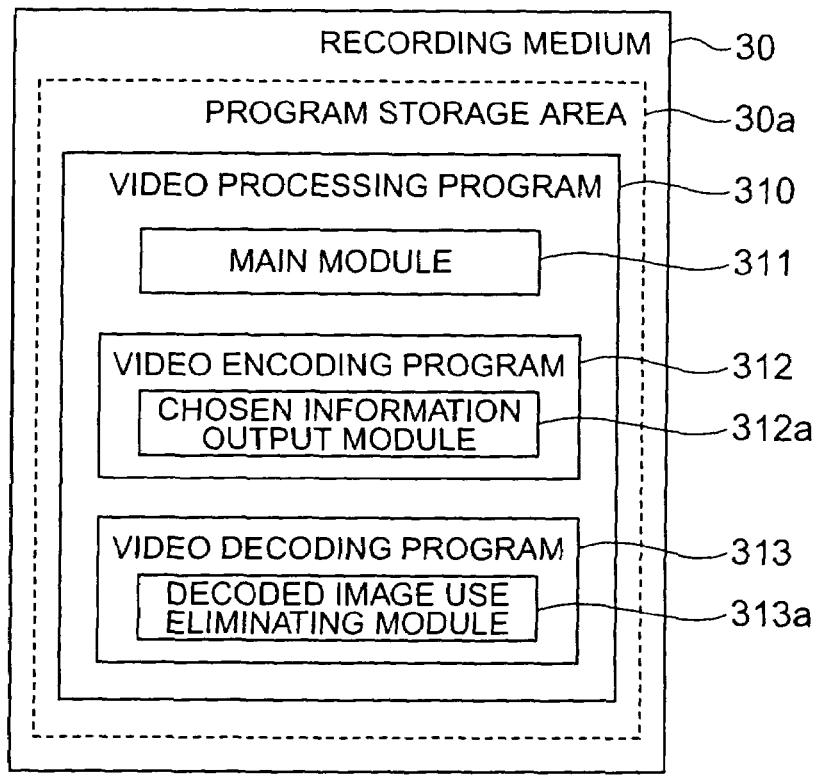
FIG. 9 is a diagram showing the configuration of the video processing program according to the present invention.

As shown in FIG. 9, video processing program 310 is stored in program storage area 30*a* formed in recording medium 30. The video processing program 310 can be executed by the video processing system 100 shown in FIG. 8 and has main module 311 responsible for video processing, after-stated video encoding program 312, and after-stated video decoding program 313.

The video encoding program 312 is provided with chosen information output module 312*a*. The function substantialized by operation of the chosen information output module 312*a* is much the same as the function of the chosen information output part 11 of the video encoding device 10.

The video decoding program 313 is provided with decoded image use eliminating module 313*a*. The function substantialized by operation of the decoded image use eliminating module 313*a* is much the same as the function of the decoded image use eliminating part 21 of the video decoding device 20.

The video processing program 310 may be configured so that part or all thereof is received through a transmission medium such as a communication line by another device to be recorded. Conversely, the video processing program 310 may also be configured to be transmitted through a communication medium to be installed in another device.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A video encoding apparatus comprising:
    an input module for effecting input of frames of pictures as a target for encoding;
    an encoder for encoding the frames of pictures to generate encoded data;
    an image storage for storing, from pictures reproduced after encoded by the encoder, at least one reference frame for use in subsequent encoding and at least one output queueing frame whose output time for display is yet to come; and
    a buffer manager for managing all the pictures stored in the image storage,
    wherein, when an IDR picture is encoded, the buffer manager outputs, along with the encoded IDR picture, a flag indicating whether to delete the at least one reference frame stored or both the at least one reference frame and the at least one output queueing frame previously stored in the image storage means.

2. The video encoding apparatus according to claim 1, wherein the encoder implements backward interframe prediction from a future frame, and wherein, when the IDR picture is encoded, the buffer manager deletes, based on the flag, a frame previously stored in the image storage which is further future than the IDR picture and will not be used as a reference frame in the backward interframe prediction.

3. A video decoding apparatus comprising:
an input module for effecting input of picture data containing encoded data representing a sequence of pictures, and a picture output instruction flag added to the encoded data;
a decoder for decoding the encoded data to generate reproduced pictures;
an image storage for storing, from the reproduced pictures, at least one reference frame for use in subsequent decoding and at least one output queuing frame whose output time for display is yet to come; and
a buffer manager for managing the at least one reference frame and the at least one output queuing frame stored in the image storage means,
wherein when an IDR picture is decoded, a picture output instruction flag corresponding to which is equal to "1", the buffer manager deletes the at least one reference frame and the at least one output queuing frame stored in the image storage.

4. The video decoding apparatus according to claim 3, wherein if the picture output instruction flag is equal to "0," the buffer manager deletes the at least one reference frame stored in the image storage.

5. A video encoding method comprising the steps of:
effecting input of frames of pictures as a target for encoding;
encoding the frames of pictures to generate encoded data;
storing in an image storage, from pictures reproduced after encoded in the encoding step, at least one reference frame for use in subsequent encoding and at least one output queuing frame whose output time for display is yet to come; and
managing the at least one reference frame and the at least one output queuing frame stored in the image storage,
wherein when an IDR picture is encoded, the managing step comprises outputting, along with the encoded IDR picture, a flag indicating whether to delete the at least one reference frame or both the at least one reference frame and the at least one output queuing frame previously stored in the image storage.

6. A video decoding method comprising the steps of:
effecting input of picture data containing encoded data representing a sequence of pictures, and a picture output instruction flag added to the encoded data;
decoding the encoded data to generate reproduced pictures;
storing in an image storage, from the reproduced pictures, at least one reference frame for use in subsequent decoding and at least one output queuing frame whose output time for display is yet to come; and
managing the at least one reference frame and the at least one output queuing frame stored in the image storage,
wherein when an IDR picture is decoded, a picture output instruction flag corresponding to which is equal to "1",the managing step comprises, deleting the at least one reference frame and the at least one output queuing frame stored in the image storage.

7. A decoding apparatus for decoding encoded pictures and outputting the decoded pictures, comprising:
a decoder configured to perform an inter prediction on the encoded pictures, using at least one reference picture selected from the decoded pictures;
at least one decoded picture buffer in which the decoded pictures are storable, wherein the decoded pictures storable in the at least one decoded picture buffer comprise the at least one reference picture and at least one non-reference picture held for future output;
an IDR picture identifier configured to identify an IDR picture among the decoded pictures and determine a value of a flag attached to the IDR picture; and
a picture remover responsive if the decoded picture is an IDR picture to empty the at least one decoded picture buffer, when the determined value of the flag so dictates, without outputting the stored pictures therefrom.

8. A decoding apparatus according to claim 7, wherein if the decoded picture is an IDR picture, the picture remover acknowledges the at least one reference picture stored in the at least one decoded picture buffer as no longer needed for reference and removes same from the at least one decoded picture buffer.

9. A method for decoding encoded pictures and outputting the decoded pictures, comprising:
performing an inter prediction to decode the encoded pictures, using at least one reference picture selected from the decoded pictures;
storing in at least one decoded picture buffer the at least one reference picture and at least one non-reference picture held for future output;
identifying an IDR picture among the decoded pictures and determining a value of a flag attached to the IDR picture; and
if the decoded picture is an IDR picture, emptying the at least one decoded picture buffer, when the determined value of the flag so dictates, without outputting the stored pictures therefrom.

10. A method according to claim 9, further comprising acknowledging, if the decoded picture is an IDR picture, the at least one reference picture stored in the at least one decoded picture buffer as no longer needed for reference and removing same from the at least one decoded picture buffer.

11. An encoding apparatus, comprising:
an encoder configured to encode a series of pictures, using at least one reference picture selected from the series of pictures;
an IDR picture identifier configured to identify an IDR picture among the series of pictures;
a flag generator configured to determine, if an IDR picture is identified, whether to empty a decoded picture buffer of a decoder or only delete any reference picture stored in the decoded picture butter, leaving any other picture stored therein, and generate a flag having a value indicative of a determined result; and
a flag adder configured to add the generated flag to the encoded IDR picture.

12. A encoding method comprising:
encoding a series of pictures, using at least one reference picture selected from the series of pictures;
identifying an IDR picture among the series of pictures;
if an IDS picture is identified, determining whether to empty a decoded picture buffer of a decoder of only delete any reference picture stored in the decoded picture buffer, leaving any other picture stored therein;
generating a flag having a value indicative of a determined result; and
adding the flag to the encoded IDR picture.

* * * * *

UNITED STATES PATENT AND TRADEMARK OFFICE
CERTIFICATE OF CORRECTION

PATENT NO. : 7,346,216 B2 Page 1 of 1
APPLICATION NO. : 10/658190
DATED : March 18, 2008
INVENTOR(S) : Satoru Adachi et al.

It is certified that error appears in the above-identified patent and that said Letters Patent is hereby corrected as shown below:

In the Claims

Column 16, in claim 11, line 10, after "decoded picture" delete "butter" and substitute --buffer-- in its place.

Column 16, in claim 12, line 1, before "encoding method" delete "A" and substitute --An-- in its place.

Column 16, in claim 12, line 6, after "of a decoder" delete "of" and substitute --or-- in its place.

Signed and Sealed this

Thirtieth Day of September, 2008

JON W. DUDAS
*Director of the United States Patent and Trademark Office*

UNITED STATES PATENT AND TRADEMARK OFFICE
CERTIFICATE OF CORRECTION

PATENT NO. : 7,346,216 B2  Page 1 of 1
APPLICATION NO. : 10/658190
DATED : March 18, 2008
INVENTOR(S) : Satoru Adachi et al.

It is certified that error appears in the above-identified patent and that said Letters Patent is hereby corrected as shown below:

In the Claims

Column 16, in claim 11, line 50, after "decoded picture" delete "butter" and substitute --buffer-- in its place.

Column 16, in claim 12, line 55, before "encoding method" delete "A" and substitute --An-- in its place.

Column 16, in claim 12, line 60, after "of a decoder" delete "of" and substitute --or-- in its place.

This certificate supersedes the Certificate of Correction issued September 30, 2008.

Signed and Sealed this

Twenty-first Day of October, 2008

JON W. DUDAS
*Director of the United States Patent and Trademark Office*